United States Patent [19]

Jarecki

[11] Patent Number: 4,607,451
[45] Date of Patent: Aug. 26, 1986

[54] INSECT TRAP

[76] Inventor: Frank E. Jarecki, 5650 Culpepper Dr., Erie, Pa. 16506

[21] Appl. No.: 761,899

[22] Filed: Aug. 2, 1985

[51] Int. Cl.⁴ .............................................. A01M 1/06
[52] U.S. Cl. ........................................ 43/139; 15/344; 15/352
[58] Field of Search .................. 43/139, 138, 134; D32/18; 15/344, 352

[56] References Cited

U.S. PATENT DOCUMENTS

| | | | |
|---|---|---|---|
| 1,714,287 | 5/1929 | Wilson | 43/139 |
| 3,196,577 | 7/1965 | Plunkett | 43/139 |
| 3,214,861 | 11/1965 | Arther | 15/344 |
| 3,330,063 | 7/1967 | Lockwood | 43/139 |
| 3,477,087 | 11/1969 | Robinson | 15/344 |
| 3,758,914 | 9/1973 | Nupp | 15/344 |
| 4,074,458 | 2/1978 | Catlett | 43/139 |
| 4,175,352 | 11/1979 | Catlett | 43/139 |
| 4,282,673 | 8/1981 | Focks | 43/139 |

Primary Examiner—Gene P. Crosby
Attorney, Agent, or Firm—Charles L. Lovercheck; Wayne L. Lovercheck; Dale R. Lovercheck

[57] ABSTRACT

A vacuum operated insect trap is disclosed. The instrument is made up of a suction device adapted to be held in the hand of a person and connected to a funnel like adapter by means of a hollow wand. The user holds the instrument by its handle and holds the mouth of the applicator near the insect which is drawn into the applicator and thence into the suction device by said vacuum. A removable tank is attached to the instrument.

2 Claims, 2 Drawing Figures

INSECT TRAP

BACKGROUND OF THE INVENTION

Flies, mosquitos and other pesky insects present a problem around campfires, lawns, patios and even in dining rooms of homes and fine restaurants. The common fly swatter is still one of the devices often relied upon to rid a dining area of an occasional insect. The fly swatter is unsanitary at best and presents results that are repellent to the appetites of many individuals.

STATEMENT OF THE INVENTION

The present invention provides a vacuum device with a hollow wand and a funnel type applicator which can be placed near an insect and the vacuum will draw the insect into the applicator and into the receptacle tank from which it can be dispensed later into a suitable repository.

OBJECTS OF THE INVENTION

It is an object of the invention to provide an improved insect trap.

Another object of the invention is to provide a portable vacuum actuated insect trap.

Another object of the invention is to provide an insect trap that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWING

Figure 1:
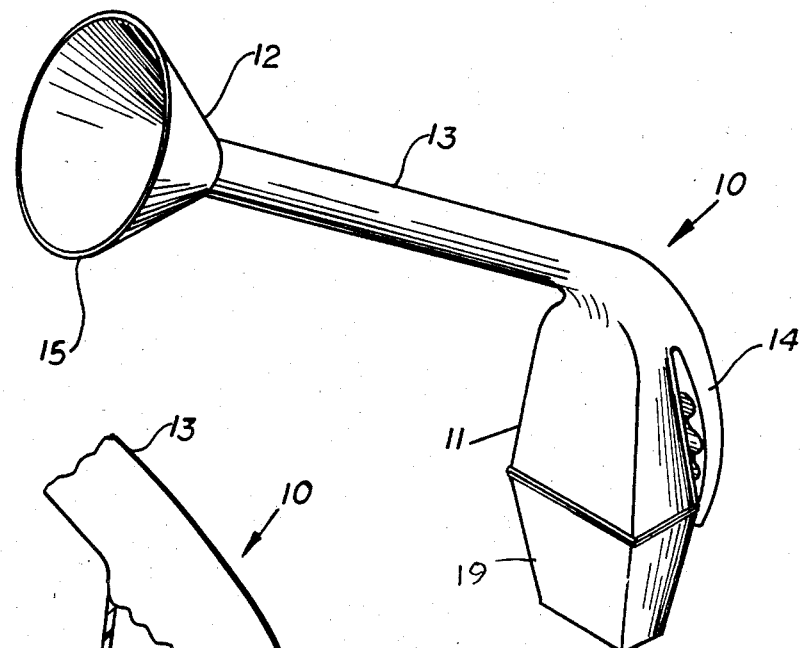
FIG. 1 is an isometric view of the insect trap according to the invention.
Figure 2:
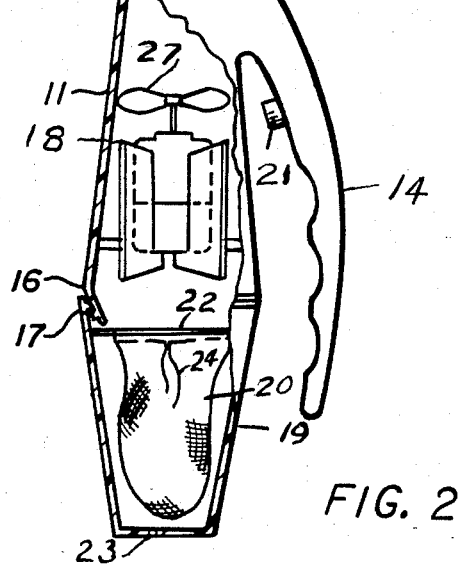
FIG. 2 is a side view of the insect trap according to the invention, shown partly in cross section.

Now with more particular reference to the drawing, in FIGS. 1 and 2 I show an insect trap having a vacuum device 11 driven by a suitable electric motor therein with a tank 19 removably supported on one end. The funnel shaped applicator 15 is attached to tank 19 by wand 13 fixed to one end. A removable tank 19 is supported on the vacuum device in an ordinary way.

The suction device 11 has a handle 14 integrally attached to it for convenience in the example shown, although a different type of handle could easily be used. The body of the vacuum device itself could be held in the hand of a person.

The tank 19 may be removable to remove the trapped insects from it. The tank has a closure 22 with a central opening. The tank could have a suitable bag 20 similar to an ordinary vacuum cleaner type bag used in household cleaning. Bag 20 receives a flange around the opening and is attached to the flange by draw string 24.

The wand 13 may preferably be integrally molded with the body of the vacuum device or it could be a separate unit removably attached thereto by a snap connection in a well known manner wherein a bead around the inside of vacuum device 11 and a flange 16 is formed around the vacuum device and a slot 17 to receive flange 16.

Applicator 12 is frustoconical in shape having the small end attached to the wand 13. The applicator may have a circular opening 15 which, for example, may be four inches in diameter. The wand 13 could be, for example, $\frac{1}{2}$ inch in diameter in order to provide for sufficient air flow. The applicator could be of any other shape, depending on the taste of the designer. The blower 18 could be electric powered battery operated having a push button 21 to start it.

The motor, wand and applicator could take many other shapes or forms. The motor could be driven by a rechargable battery. The basic idea being to provide a vacuum device with an applicator suitable to reach insects at some distance remote from the vacuum device. In this connection, the wand could be 12 to 18 inches long, for example. The insect trap could be made in other configurations.

When the operator locates a stray insect he turns on motor 18 and holds the applicator 12 over the insect. Suction pulls the insect past the fan 27 and into porous bag 20. Vent hole 23 allows air to vent and then to escape from tank 19.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A portable vacuum operated insect trap instrument comprising a source of vacuum,
    an elongated wand connected to said source of vacuum and a hollow frustoconical shaped applicator connected to said wand and the wand attached to the vacuum device at an obtuse angle,
    said source of vacuum comprises an electric driven blower,
    a tank having bag means therein to receive insects drawn through said applicator and said wand into said tank,
    said source of vacuum has a first end and a second end,
    said tank being removably supported on said second end having said bag means therein to receive insects,
    said wand being attached to said vacuum means at the end opposite said tank,
    said wand extending from said vacuum device a substantial distance whereby the operator can reach insects on a ceiling of an ordinary room with said frustoconical applicator,
    said bag has a closure with a central opening having a drawstring supporting it on a flange in said tank,
    said drawstring being adapted to close the mouth of said bag when said bag is removed from said tank.

2. The insect trap recited in claim 1 wherein said vacuum is provided by a fan driven by a rechargable battery.

* * * * *